US012623961B2

(12) United States Patent
Durand et al.

(10) Patent No.: US 12,623,961 B2
(45) Date of Patent: May 12, 2026

(54) THERMAL PROTECTION METHOD

(71) Applicant: SAINT-GOBAIN CENTRE DE RECHERCHES ET D'ETUDES EUROPEEN, Courbevoie (FR)

(72) Inventors: Audrey Durand, Dordives (FR); Franceline Villermaux, Avignon (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 19 days.

(21) Appl. No.: 17/908,345

(22) PCT Filed: Mar. 2, 2021

(86) PCT No.: PCT/EP2021/055207
§ 371 (c)(1),
(2) Date: Aug. 31, 2022

(87) PCT Pub. No.: WO2021/175865
PCT Pub. Date: Sep. 10, 2021

(65) Prior Publication Data
US 2023/0104614 A1     Apr. 6, 2023

(30) Foreign Application Priority Data
Mar. 3, 2020    (FR) ...................................... 2002153

(51) Int. Cl.
*C03C 25/1095*     (2018.01)
*C03C 25/42*     (2006.01)
(Continued)

(52) U.S. Cl.
CPC .......... *C03C 25/1095* (2013.01); *C03C 25/42* (2013.01); *F16L 59/04* (2013.01);
(Continued)

(58) Field of Classification Search
CPC ............................ C03C 25/1095; C03C 25/42
See application file for complete search history.

(56) References Cited

U.S. PATENT DOCUMENTS 4,282,284 A * 8/1981 George .................... H01B 3/02
                                                           442/139
4,710,480 A * 12/1987 Buschmann ............ C04B 35/80
                                                           501/153
(Continued)

FOREIGN PATENT DOCUMENTS

FR          1543254 A     10/1968
FR          3008967 A1     1/2015
FR          3011255 A1     4/2015

OTHER PUBLICATIONS

International Search Report corresponding to International Application No. PCT/EP2021/055207, dated May 10, 2021, 5 pages.

*Primary Examiner* — Robert A Vetere
(74) *Attorney, Agent, or Firm* — Ronald M. Kachmarik; Cooper Legal Group LLC

(57)     ABSTRACT

A method for thermally protecting a part according to which a protective screen is placed in an in-use position in which the screen physically isolates at least one portion of the part from a heat source. The heat source is configured to bring the temperature of the at least one portion of the part to a temperature between 400° C. and 900° C. in the absence of the protective screen. The protective screen includes a substrate of glass strands at least partially coated with a coating that includes protective particles of a crystalline material that have a melting point above 1000° C. and is composed of one or more oxides in an amount of more than 95 wt. %. The coating covers more than 50% of the outer surfaces of more than 50% of the number of strands of the substrate.

27 Claims, 2 Drawing Sheets

(51) Int. Cl.
  F16L 59/04      (2006.01)
  F16L 59/14      (2006.01)
(52) U.S. Cl.
  CPC ........ F16L 59/14 (2013.01); C03C 2217/475
        (2013.01); C03C 2217/48 (2013.01)

(56)        References Cited

U.S. PATENT DOCUMENTS 5,837,621  A  *  11/1998  Kajander  ................ C03C 25/26
                                        442/143
2003/0176125  A1*   9/2003  Ahluwalia  ................ E04D 5/10
                                        442/76
2016/0185666  A1*   6/2016  San-Miguel  ............. B01J 19/02
                                        422/240
2016/0208434  A1*   7/2016  Hamdani-Devarennes  ................
                                        C03C 25/47

* cited by examiner

[Fig 1]
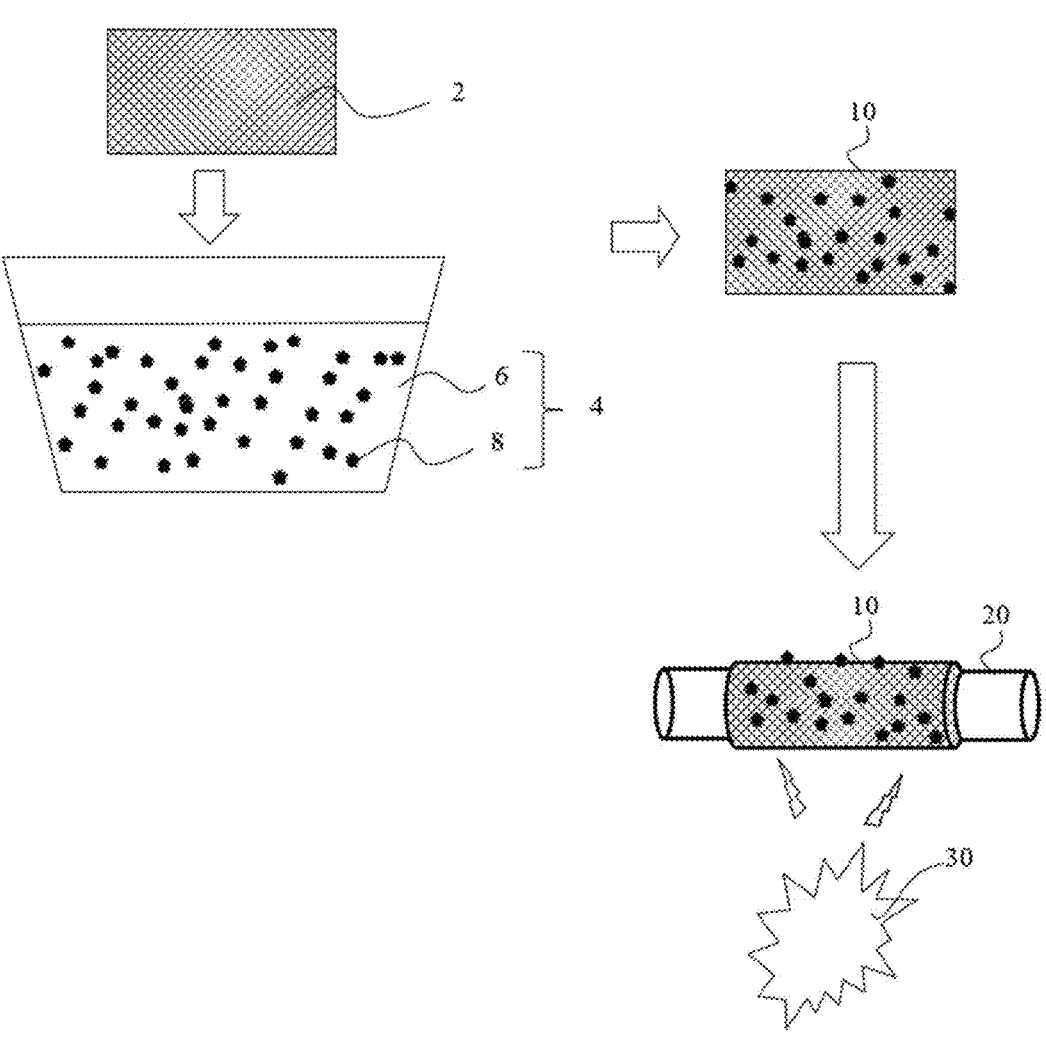

[Fig 2]
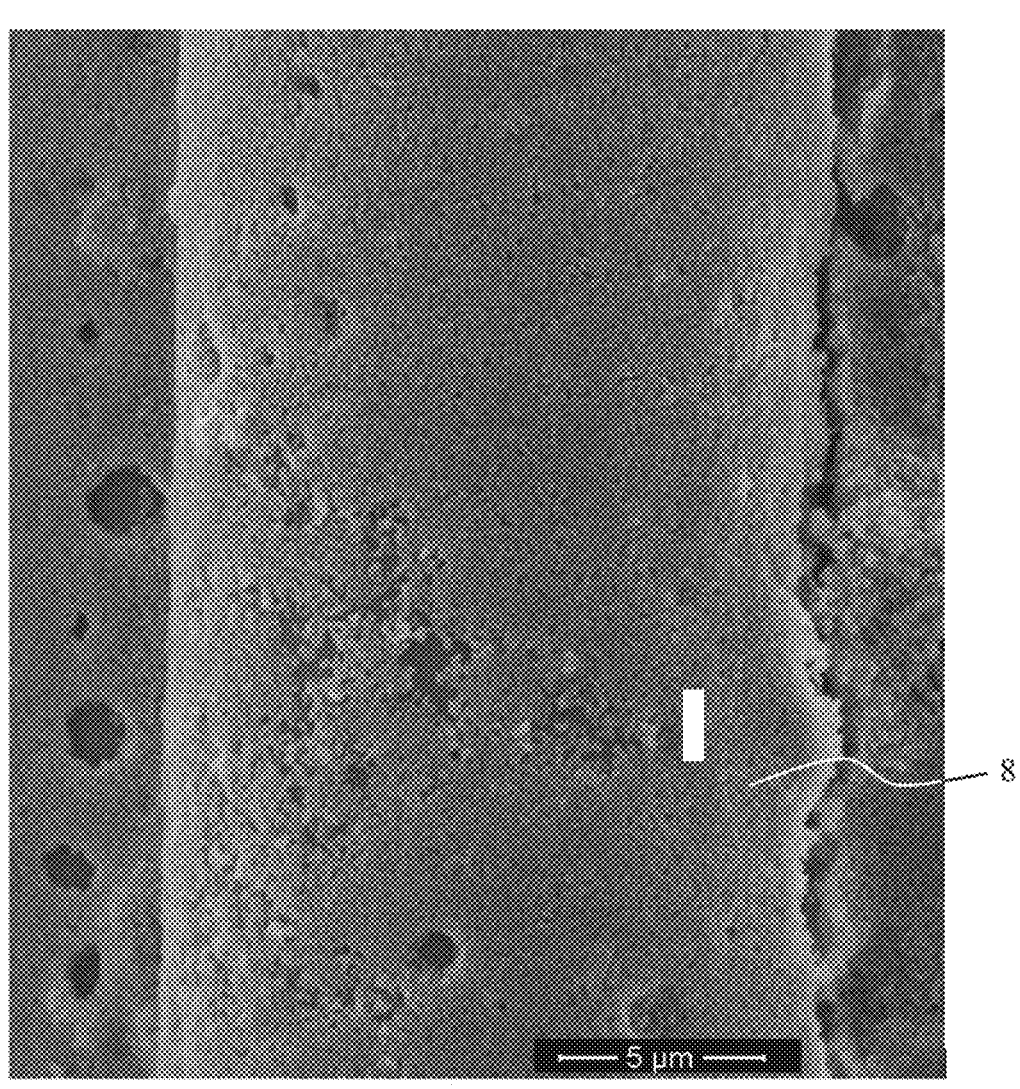

THERMAL PROTECTION METHOD

TECHNICAL FIELD

The invention relates to a method for thermally protecting a part subjected to a temperature of between 400° C. and 900° C.

PRIOR ART

The use of a textile of glass yarns for protecting a part from a temperature of between 400° C. and 900° C. is known, in particular for the thermal protection of pipes.

To this effect, fabric can be deformed to fit the part to be protected. There is thus a need for a fabric which has good deformability.

Moreover, prolonged exposure of the glass yarn fabric to a temperature of between 400° C. and 900° C. results in degradation of the mechanical properties of the yarns, and is detrimental to the longevity of the protection. There is thus also a need to increase the lifetime of such protection.

The present invention aims to at least partially meet this need.

DISCLOSURE OF THE INVENTION

Summary of the Invention

The invention proposes a method for thermally protecting a part according to which a protective screen is placed in an in-use position in which it physically isolates at least one portion of said part from a heat source, said heat source being configured to bring the temperature of said at least one portion of said part to a temperature of between 400° C. and 900° C., preferably between 400° C. and 800° C., in the absence of said protective screen, the protective screen comprising, preferably consisting of, a support made of glass yarns which is at least partially coated with a coating comprising protective particles of a crystalline material having a melting point above 1000° C. and consisting of one or more oxides in an amount of more than 95% of its weight, preferably consisting of a dry binder and of said protective particles.

Before it is placed in the in-use position, the protective screen can be optionally deformed, preferably according to the shape of the part.

Before the protective screen is placed in the in-use position, the coating of said screen can be optionally at least partially debound, or even totally debound, in particular when the protective screen has been made to fit the part to be protected before being sold.

As will be seen in more detail in the remainder of the description, the inventors have discovered that such a coating, in particular when it comprises a dry binder, improves the deformability of the protective screen.

After debinding, the coating confers excellent protection on the yarns. The lifetime of the in-use protective screen, during exposure to a temperature of between 400° C. and 900° C., preferably between 400° C. and 800° C., is thereby improved.

A method according to the invention can also comprise one or more of the following optional and preferred characteristics:

the support is a textile, preferably essentially consisting of glass yarns organized in the form of a knit, of a braid or of a fabric;

more than 90% by number of the yarns of the support have a length greater than 10 mm, said yarns being an assembly of fibers having an equivalent diameter, measured at half-length, greater than 2 μm and less than 50 μm;

the part is chosen from a driveshaft, an engine attachment harness, an element for isolating an engine, in particular a housing, a cylinder, a pipe, a cable, a conveyor roller, in particular for conveying glass sheets, a system for attaching and driving said rollers;

the glass yarns constituting the support consist of an amorphous material having an $SiO_2$ content of greater than or equal to 55%, as a mass percentage on the basis of the mass of the yarns;

the glass yarns constituting the support consist of a material having, as mass percentages on the basis of the mass of the yarns:

an $SiO_2$ content of greater than 90% and an $Al_2O_3$ content of greater than 0.1% and less than 5%, the oxides other than $SiO_2$ and $Al_2O_3$ making up the remainder to 100%, or an $SiO_2$ content of greater than 55% and less than 79.9%, an $Al_2O_3$ content of greater than 12.5% and less than 32%, and an MgO content of greater than 4% and less than 20%, the oxides other than $SiO_2$, $Al_2O_3$ and MgO making up the remainder to 100%, or an $SiO_2$ content of greater than 99.9%;

the dry binder is organic;

the dry binder comprises a film-forming agent and/or a coupling agent;

the amount of protective particles, as a mass percentage on the basis of the total mass of the coating, is greater than 29% and less than 99.5% and/or the protective particles have a median size of greater than 50 nm and less than 500 nm;

more than 90%, as mass percentage, of the protective particles exhibit a chemical analysis such that the total content of $Al_2O_3+ZrO_2+MgO+Cr_2O_3+Fe_2O_3+SiO_2$ is greater than 80%, provided that $SiO_2<50\%$, as mass percentage on the basis of the oxides;

more than 90%, as mass percentage, of the protective particles exhibit a chemical analysis such that the $Al_2O_3$ content is greater than 95%, as mass percentage on the basis of the oxides;

the coating covers more than 30%, preferably more than 40%, preferably more than 50%, preferably more than 60%, preferably more than 70%, preferably more than 80%, preferably more than 90%, preferably more than 95% of the outer surfaces of more than 30%, preferably more than 40%, preferably more than 50%, preferably more than 60%, preferably more than 70%, preferably more than 80%, preferably more than 90%, preferably more than 95%, by number, of the yarns of the support, and/or has a mean thickness of greater than 0.05 μm and less than 5 μm;

in the in-use position, the protective screen is placed so as to physically isolate the part from a source of heat at more than 400° C., more than 500° C., more than 600° C., more than 700° C., more than 800° C. or more than 850° C.;

the mass of the coating, on the basis of the mass of the protective screen, is greater than 3% and less than 25%.

Definitions

A textile may be:
  an organized structure of glass yarns, in particular a knit, a braid, a fabric, or
  a random structure of glass yarns, the latter structure not being preferred.
A "fiber" is a filament, the length of which is greater than 5 times its equivalent diameter.
The "equivalent diameter" of a fiber is the diameter of a disk with the same surface area as its cross section at half-length.
A "yarn" is an assembly of fibers which, in cross section, comprises more than 10 and preferably less than 500 000 fibers, and the length of which is greater than 5 times the diameter.
A "long fiber" is a fiber the length of which is greater than 1 mm. A "long yarn" is a yarn consisting of long fibers.
A "continuous fiber" is a fiber the length of which is greater than 10 mm. A "continuous yarn" is a yarn the length of which is greater than 10 mm, consisting of continuous fibers or of an aligned assembly of short and/or long fibers (or staple yarn).
The 50th (denoted $D_{50}$) and 99th (denoted $D_{99}$) percentiles refer to the particle sizes corresponding to the percentages equal respectively to 50% and 99%, by volume, on the curve of cumulative particle size distribution of the particle sizes of a set of particles, said particle sizes being classified in increasing order. According to this definition, 99% by volume of the particles of the set of particles thus have a size less than $D_{99}$ and 1% of the particles, by volume, have a size of greater than or equal to $D_{99}$. In a powder, the percentiles can be determined by means of a particle size distribution carried out by means of a Camsizer® XT sold by the company Horiba. The "median size" refers to the 50th percentile of a set of particles. The median size therefore divides the particles of said set of particles into first and second populations which are equal in volume, these first and second populations comprising only particles having a size greater than or equal to, or respectively less than, the median size.
  The particles may be the individual elements of a powder, but also, by extension, these elements within the coating.
Unless otherwise mentioned, all the oxide contents are mass percentages on the basis of the oxides. A mass content of an oxide of a metal element relates to the total content of this element expressed in the form of the most stable oxide, according to the usual industry convention.
A sum of oxide contents does not imply the presence of all these oxides. For example, "$Al_2O_3+SiO_2$" is the sum of the $Al_2O_3$ and $SiO_2$ contents, but does not exclude the absence of one of these oxides.
"Debinding" is intended to mean at least partial elimination of the dry binder.
The "in-use position" of the protective screen is the position in which the protective screen is placed in order to physically isolate the part from the heat source.
The term "contain" or "comprise" or "have" should be interpreted in a nonlimiting manner.
Unless otherwise mentioned, all the means are arithmetic means.

BRIEF DESCRIPTION OF THE DRAWINGS

Other characteristics and advantages of the invention will emerge further on reading the detailed description which follows and on examining the appended drawing in which FIG. 1 illustrates schematically a method according to the invention;
FIG. 2 is a photograph, taken with a scanning electronic microscope, of a yarn of the protective screen of example 2 used according to the invention, after drying at 60° C. for 12 hours. The coating at the surface of the yarn, and in particular the protective particles, are clearly distinguished.
In the various figures, identical references are used to denote identical or analogous members.

DETAILED DESCRIPTION

The protective screen 10 represented in FIG. 1 can be obtained by the production method comprising the following steps 1) to 3):
  1) preparing the support 2 and a suspension 4 comprising the liquid binder 6 and the protective particles 8 (FIG. 1);
  2) applying said suspension to the yarns of the support;
  3) drying so as to reduce the water content in order to convert the suspension into a coating which is in a solid form.
In step 1), the support and the suspension are prepared.
Support
The support 2 may be of the type of those used, until the invention, for thermal protection. Preferably, it is in the form of a textile, preferably essentially consisting of organized glass yarns, preferably in the form of a knit, of a braid or of a fabric.
The support is preferably a fabric, preferably having a grammage of greater than 50 $g/m^2$, preferably greater than 100 $g/m^2$, preferably greater than 200 $g/m^2$.
The yarns may be "glass yarns" of the prior art.
Preferably, more than 90%, preferably more than 95%, by number of the yarns, preferably 100% of the yarns:
  have a length of greater than 10 mm; and
  are an assembly of fibers having an equivalent diameter, measured at half-length, greater than 2 μm, preferably greater than 4 μm, preferably greater than 6 μm and/or preferably less than 50 μm, preferably less than 30 μm, preferably less than 20 μm.
Preferably, the yarns consist of an amorphous material having an $SiO_2$ content of greater than or equal to 55%, as mass percentages on the basis of the mass of the yarns. Preferably, the $SiO_2$ content of the yarns is greater than 60%, preferably greater than 65%, preferably greater than 70%, preferably greater than 75%, preferably greater than 80%, preferably greater than 85%, preferably greater than 90%, preferably greater than 92%, preferably greater than 94%, preferably greater than 96%, as mass percentages on the basis of the mass of the yarns.
In one preferred embodiment, the $SiO_2$ content of the yarns is greater than 99.5%, preferably greater than 99.9%, as mass percentages on the basis of the mass of the yarns. The Quartzel® yarns sold by the company Saint-Gobain Quartz are particularly well suited to this embodiment.
In one embodiment, the yarns exhibit the following chemical analysis, as mass percentages on the basis of the mass of the yarns:
  $SiO_2$ content: preferably greater than 90%, preferably greater than 92%, preferably greater than 94%, preferably greater than 95%, preferably greater than 96%, and preferably less than 99.9%, preferably less than 99.5%, and
  $Al_2O_3$ content: preferably greater than 0.1%, preferably greater than 0.2% and preferably less than 5%, preferably less than 4%, and content of other oxides: preferably less than 3%, preferably less than 2%, with preferably $Na_2O$ less than 0.3%, preferably less than 0.2%, and preferably $K_2O$ less than 0.3%, preferably less than 0.2% and preferably MgO less than 0.3%, and preferably less than 0.2%.

In one embodiment, the yarns exhibit the following chemical analysis, as mass percentages on the basis of the mass of the yarns:

$SiO_2$ content: preferably greater than 55% and preferably less than 79.9%, preferably less than 75%, preferably less than 70%, preferably less than 66%, and $Al_2O_3$ content: preferably greater than 12.5%, preferably greater than 15%, preferably greater than 20%, preferably greater than 24% and preferably less than 32%, preferably less than 30%, preferably less than 27%, and MgO content: preferably greater than 4%, preferably greater than 7%, preferably greater than 9%, and preferably less than 20%, preferably less than 18%, preferably less than 16%, and content of other oxides: preferably less than 5%, preferably less than 4%, preferably less than 3%, preferably less than 2%.

Regardless of the embodiment, the "other oxides" are preferably impurities.

Suspension

The suspension 4 can be produced by mixing a liquid binder 6 and protective particles 8. The protective particles can be partially or completely replaced with precursors, optionally in the form of particles, capable of forming said protective particles by heat treatment at a temperature of greater than 200° C., preferably greater than 300° C., preferably greater than 400° C.

Preferably, protective particle precursors are not used. The protective screen is advantageously immediately operational. The inventors have in fact discovered that the part is not efficiently thermally protected by the precursors and that the part can be damaged before the precursors have been converted. It is therefore particularly advantageous to incorporate the protective particles into the suspension, before said suspension is applied.

Any of the conventional mixing techniques can be implemented.

Preferably, when several organic constituents are part of the composition of the liquid binder, said organic constituents are firstly mixed together, preferably with a solvent, and then, secondly, the protective particles are subsequently introduced, the mixing continuing so as to obtain the suspension.

In one preferred embodiment, the suspension comprises a solvent, preferably water, in an amount of greater than 39%, preferably greater than 40%, preferably greater than 50%, preferably greater than 60%, preferably greater than 70% and/or preferably less than 92%, preferably less than 90%, preferably less than 85%, as mass percentage on the basis of the mass of the suspension.

Liquid Binder

One function of the liquid binder is to facilitate the dispersion of the protective particles in the coating.

The liquid binder preferably comprises a solvent, in particular if the organic constituents are in a solid form.

The solvent is preferably water. It allows the dissolution, or the formation of an emulsion, of the solid organic components, but also the decrease in the viscosity of the suspension, such that it can be applied to the support.

The amount of solvent is preferably greater than 82%, preferably greater than 85%, preferably greater than 90%, preferably greater than 93% and/or preferably less than 99.8%, preferably less than 99.5%, preferably less than 99%, as mass percentage on the basis of the mass of the liquid binder.

Preferably, in the suspension, the remainder to 100% with the solvent consists of the dry binder and the protective particles.

Preferably, the liquid binder comprises a film-forming agent and/or a coupling agent and/or another organic constituent. Preferably, the liquid binder comprises a film-forming agent and/or a coupling agent.

Preferably, the film-forming agent is chosen from epoxy resins, polyesters, polyvinyl acetates, polyvinyl alcohol, polyolefins, polyurethanes and starch, and mixtures thereof.

Preferably, the amount of film-forming agent, as mass percentage on the basis of the mass of the liquid binder, is greater than 0.5%, preferably greater than 0.6% and/or preferably less than 10%, preferably less than 9%, preferably less than 8%, preferably less than 7%, preferably less than 6%, preferably less than 5%, preferably less than 4%.

Preferably, the coupling agent is chosen from silanes, organic titanates and organic zirconates, and mixtures thereof. Preferably, the coupling agent is a silane.

Preferably, the amount of coupling agent, as mass percentage on the basis of the mass of the liquid binder, is greater than 0.2%, preferably greater than 0.3%, preferably greater than 0.4% and/or preferably less than 4%, preferably less than 3%, preferably less than 2%, preferably less than 1%.

In one embodiment, the liquid binder contains a film-forming agent and a coupling agent. Preferably in this embodiment, the amount of film-forming agent, as mass percentage on the basis of the mass of the liquid binder, is greater than 0.5%, preferably greater than 0.6% and/or preferably less than 10%, preferably less than 9%, preferably less than 8%, preferably less than 7%, preferably less than 6%, preferably less than 5%, preferably less than 4%, and the amount of coupling agent, as mass percentage on the basis of the mass of the liquid binder, is greater than 0.2%, preferably greater than 0.3%, preferably greater than 0.4%, and/or preferably less than 4%, preferably less than 3%, preferably less than 2%, preferably less than 1%. Also preferably, in this embodiment, the coupling agent is a silane and the film-forming agent is chosen from epoxy resins, polyesters, polyvinyl acetates, polyvinyl alcohol, polyolefins, polyurethanes and starch, and mixtures thereof.

In one embodiment, with the exception of a film-forming agent and/or of a coupling agent, the liquid binder does not comprise any other organic constituent.

In one embodiment, the liquid binder comprises another organic constituent, in an amount of greater than 0.05% and/or preferably less than 4%, preferably less than 3%, preferably less than 2%.

In one preferred embodiment, the other organic constituent is chosen from a lubricant, a surfactant, an emulsifier and a wetting agent, and mixtures thereof, preferably from an ethylene-propylene copolymer, a polyethylene glycol ether, ethanolamides, aliphatic polyamines, ethoxylated amines, phenyl glycol ethers, imizadolines, alkylamides, polyethylene glycols, plant oils, fatty acid esters, ethoxylated fatty acids and ethoxylated alkylphenols, and mixtures thereof. These compounds are used for the functions that they have in the technical field of fiber production, in particular sizing. Those skilled in the art know how to determine their natures and their amounts.

In one embodiment, the liquid binder contains a film-forming agent and/or a coupling agent, and another organic constituent, preferably chosen from a lubricant, a surfactant, an emulsifier and a wetting agent, and mixtures thereof.

Protective Particles

Preferably, the amount of protective particles, as mass percentage on the basis of the mass of the suspension, is greater than 7%, preferably greater than 10%, preferably greater than 15%, preferably greater than 20% and/or preferably less than 60%, preferably less than 50%, preferably less than 40%, preferably less than 30%, preferably less than 25%.

Preferably, the protective particles have a median size of greater than 50 nm, preferably greater than 100 nm and/or preferably less than 500 nm, preferably less than 400 nm, preferably less than 300 nm.

Preferably, the protective particles have a 99th percentile, $D_{99}$, of less than 5 μm, preferably less than 4 μm, preferably less than 3 μm, preferably less than 2 μm, preferably less than 1 μm, preferably less than 0.5 μm.

Preferably, the protective particles have a melting point above 1100° C., preferably above 1200° C., and/or below 2900° C., preferably 2800° C. The melting point of the protective particles can be determined by differential scanning calorimetry (DSC).

Preferably, this material consists of oxide(s) in an amount of more than 98%, preferably more than 99%, preferably more than 99.5%, preferably more than 99.8%, preferably more than 99.9% of its mass. Preferably, said material consists substantially entirely of oxide(s).

Preferably more than 90%, preferably more than 95%, preferably more than 99%, as mass percentage, of the protective particles of one or more oxides exhibit a chemical analysis comprising $Al_2O_3$, $ZrO_2$, $MgO$, $Cr_2O_3$, $Fe_2O_3$, preferably such that the sum $Al_2O_3+ZrO_2+MgO+Cr_2O_3+Fe_2O_3+SiO_2$ is greater than 80%, preferably greater than 85%, preferably greater than 90%, preferably greater than 95%, preferably greater than 99%, provided that the $SiO_2$ content is less than 50%, preferably less than 40%, as mass percentage on the basis of the oxides. Preferably, the sum $Al_2O_3+ZrO_2+Cr_2O_3$ is greater than 80%, preferably greater than 85%, preferably greater than 90%, preferably greater than 95%, preferably greater than 99%.

Again preferably, the $Al_2O_3$ content is greater than 95%, preferably greater than 98%, preferably greater than 99%, preferably greater than 99.5%. Advantageously, the mechanical properties after exposure to a temperature of between 400° C. and 900° C., in particular the tensile strength, are thereby improved. Preferably, the $Na_2O+K_2O$ content is less than 0.02%, preferably less than 0.01%, preferably less than 0.005%, as mass percentage on the basis of the mass of the alumina particles, in particular when the yarns of the support are made of a material which has an $SiO_2$ content>99%.

Preferably, corundum, zircon, zirconia, mullite, cordierite, eskolaite, spinel, steatite, enstatite, and mixtures thereof, preferably corundum, zirconia, eskolaite and mixtures thereof, preferably corundum, represent(s) more than 80%, preferably more than 90%, preferably more than 95%, preferably more than 98%, preferably more than 99%, or even substantially 100% of the mass of the crystalline phases of the material of the protective particles.

Preferably, the alumina particles are corundum particles.

Advantageously, the mechanical properties after exposure to a temperature between 400° C. and 900° C., in particular the tensile strength, are thereby improved.

The protective particles can be, at least partially, replaced with a precursor, that is to say with a compound which, during the production or the use of the protective screen, produces protective particles in the coating. Preferably, when the particles are alumina particles, the alumina precursor is chosen from boehmite, alumina trihydrate, and mixtures thereof.

In step 2) the suspension is applied to the yarns of the support.

The application of the suspension to the yarns can be carried out by impregnation of the support. The impregnation can be carried out according to any technique known to those skilled in the art, in particular by the doctor blade process, by tape casting, by immersion (for example according to the dip coating process), with a gun, with a brush, or by screen printing. Those skilled in the art know how to adjust the suspension, and in particular the viscosity thereof, as a function of the method of application, so that it penetrates into the support and impregnates it.

The impregnation advantageously makes it possible to coat the outer surfaces of the yarns which are not exposed to the outside of the support, that is to say not to limit the coating to the exposed surfaces of the support. In other words, an impregnation allows the application of a coating deep into the support. The extent of this coating is thereby considerably increased.

The coating extends into the thickness of the support. The impregnation therefore considerably increases the protective capacity of the protective screen.

In one embodiment, in particular when the support consists of a superposition of several fabrics, each fabric is individually impregnated before being superposed on the other impregnated fabrics.

Preferably, the suspension penetrates into the support over more than 50%, preferably more than 60%, preferably more than 70%, preferably more than 80%, preferably more than 90% of the thickness of the support.

Preferably, the suspension penetrates through the entire thickness of the support. All the yarns of the support thus participate in the thermal protection.

The inventors have discovered that, surprisingly, if the coating is deposited on the yarns before they are assembled in the form of the support, the yarns become brittle. It is then impossible to assemble them. It is therefore essential that the coating be performed on the support, and not on the unassembled yarns.

Preferably, more than 30%, preferably more than 40%, preferably more than 50%, preferably more than 60%, preferably more than 70%, preferably more than 80%, preferably more than 90%, preferably more than 95%, by number of the yarns of the support, are covered in an amount of more than 30%, preferably more than 40%, preferably more than 50%, preferably more than 60%, preferably more than 70%, preferably more than 80%, preferably more than 90%, preferably more than 95% of their outer surfaces, by suspension.

Preferably, the amount of suspension applied is adjusted such that the coating has, after drying at 60° C. for 12 hours, a mean thickness of greater than 0.05 μm, preferably greater than 0.1 μm, preferably greater than 0.2 μm and less than 5 μm, preferably less than 4 μm, preferably less than 3 μm, preferably less than 2 μm, preferably less than 1 μm. The adjustment can in particular result from an adjustment of the viscosity of the suspension with the solvent.

Preferably, the coating is substantially uniformly distributed at the surface of the yarns. Preferably, the coating is substantially continuous, that is to say that it is not interrupted. "Thermal bridges" which are detrimental to the efficiency of the protection are thus avoided. An impregnation is particularly advantageous for conferring uniformity and continuity on the coating.

Preferably, the amount of suspension applied is adjusted such that the mass of the coating, on the basis of the mass of the protective screen, after drying at 60° C. for 12 hours, is greater than 3%, preferably greater than 5%, preferably greater than 8%, preferably greater than 9%, and preferably less than 25%, preferably less than 22%, preferably less than 20%.

Preferably, the protective particles of the coating are substantially uniformly distributed at the surface of the yarns of the support.

In step 3), drying of the suspension is carried out. Any of the conventional drying techniques can be used.

The drying is adjusted so as to reduce the water content of the suspension for converting the suspension into a coating which is in the form of a solid. In particular, the liquid binder is converted into a dry binder.

Preferably, the water content of the dry binder is less than 5%, preferably less than 4%, preferably less than 3%, preferably less than 2%, preferably less than 1%.

Preferably, the drying is carried out in an oven.

Preferably, the drying is carried out at a temperature of greater than 40° C., preferably greater than 50° C. and/or preferably less than 80° C., preferably less than 70° C. A drying temperature equal to 60° C. is very suitable.

The time for which the maximum temperature is maintained during the drying is preferably greater than 8 hours, preferably greater than 10 hours and/or preferably less than 20 hours, preferably less than 15 hours. A time for which the maximum temperature is maintained during the drying which is equal to 12 hours is very suitable.

Protective Screen

The protective screen 10 obtained at the end of step 3) consists of the support 2 of glass yarns at least partially coated with a coating consisting of the dry binder 6 and the protective particles 8.

The support type, the structure and composition of the yarns, the composition and particle size distribution of the protective particles, the nature of the film-forming agent, the nature of the coupling agent, the nature of the organic constituent other than the film-forming agent and/or the coupling agent, the percentage surface area of the yarns that have been coated, and the continuity of the coating are identical to those described above for the suspension.

Preferably, the amount of protective particles, as mass percentage on the basis of the total mass of the coating, is greater than 29%, preferably greater than 40%, preferably greater than 50%, preferably greater than 60%, preferably greater than 70% and/or preferably less than 99.5%, preferably less than 99%, preferably less than 98%, preferably less than 97%.

Preferably, the dry binder comprises a film-forming agent and/or a coupling agent and/or another organic constituent. Preferably, the dry binder comprises a film-forming agent and/or a coupling agent.

Preferably, the amount of film-forming agent, as mass percentage on the basis of the mass of the coating, is greater than 0.3%, preferably greater than 0.5%, preferably greater than 1%, preferably greater than 1.5%, preferably greater than 1.8%, and/or preferably less than 57%, preferably less than 50%, preferably less than 40%, preferably less than 40%, preferably less than 25%, preferably less than 20%, preferably less than 18%.

Preferably, the amount of coupling agent, as mass percentage on the basis of the mass of the coating, is greater than 0.1%, preferably greater than 0.2%, preferably greater than 0.4%, preferably greater than 0.6%, preferably greater than 0.8%, preferably greater than 1%, preferably greater than 1.2%, and/or preferably less than 35%, preferably less than 30%, preferably less than 25%, preferably less than 20%, preferably less than 18%.

In one embodiment, the dry binder contains a film-forming agent and a coupling agent. Preferably in this embodiment, the amount of film-forming agent, as mass percentage on the basis of the coating, is greater than 0.3%, preferably greater than 0.5%, preferably greater than 1%, preferably greater than 1.5%, preferably greater than 1.8%, and/or preferably less than 57%, preferably less than 50%, preferably less than 40%, preferably less than 40%, preferably less than 25%, preferably less than 20%, preferably less than 18%, and the amount of coupling agent, as mass percentage on the basis of the mass of the coating, is greater than 0.1%, preferably greater than 0.2%, preferably greater than 0.4%, preferably greater than 0.6%, preferably greater than 0.8%, preferably greater than 1%, preferably greater than 1.2%, and/or preferably less than 35%, preferably less than 30%, preferably less than 25%, preferably less than 20%, preferably less than 18%.

In one embodiment, with the exception of a film-forming agent and/or of a coupling agent, the coating does not comprise any other organic constituent.

In one embodiment, the coating comprises another organic constituent, in an amount, as mass percentage on the basis of the mass of the coating, of greater than 0.05%, preferably greater than 0.1%, preferably greater than 0.2%, preferably greater than 0.3% and/or preferably less than 34%, preferably less than 30%, preferably less than 25%, preferably less than 20%, preferably less than 15%, preferably less than 10%.

Preferably, the coating has a mean thickness of greater than 0.05 μm, preferably greater than 0.1 μm, preferably greater than 0.2 μm and less than 5 μm, preferably less than 4 μm, preferably less than 3 μm, preferably less than 2 μm, preferably less than 1 μm.

Preferably, the mass of the coating, on the basis of the mass of the protective screen, is greater than 3%, preferably greater than 5%, preferably greater than 8%, preferably greater than 9%, and preferably less than 25%, preferably less than 22%, preferably less than 20%.

Preferably, more than 50%, preferably more than 60%, preferably more than 70%, preferably more than 80%, preferably more than 90% of the thickness of the support comprises coated yarns. Preferably, the entire thickness of the support comprises coated yarns.

Preferably, the coating is distributed substantially uniformly at the surface of the yarns of the support.

The protective screen preferably has a thickness of greater than 0.2 mm, preferably greater than 0.5 mm, preferably greater than 1 mm, and preferably less than 10 mm, preferably less than 5 mm.

The protective screen preferably has a low stiffness.

The stiffness is measured according to standard ASTM D1388-18, option A (by the cantilever test method) with the following differences: the measurement is carried out at room temperature and at a relative humidity equal to 50%. The stiffness value is the bending length (according to said standard) c, in mm.

The higher the value of c, the stiffer the protective screen.

Preferably, the protective screen has a stiffness of less than 150 mm, preferably less than 130 mm, preferably less than 110 mm, and preferably greater than 5 mm, preferably greater than 10 mm, preferably greater than 20 mm.

Advantageously, the protective screen has a good capacity for being made to fit, without damage, the part to be protected, while at the same time retaining the shape given after deformation.

Placing in the In-Use Position

The very high thermal protection capacity of the protective screen makes it possible to use it in extreme applications.

The part to be protected 20 may be in particular:
a drive shaft, in particular of an airplane or helicopter engine,
an engine attachment harness,
an element for isolating an engine, in particular a housing,
a cylinder,
a pipe,
a cable, in particular an electrical cable and a thermocouple cable,
a conveyor roller, in particular for conveying glass sheets,
a system for attaching and driving said rollers,
an insulation mat used in the thermal protection of a nacelle of an engine, in particular a nacelle of an airplane engine,
an insulation mat used in the thermal protection of an engine, in particular an engine of an airplane, of a helicopter and of a space rocket,
a suspension structure of an engine, in particular struts of an airplane or helicopter engine,
a thrust reverser, in particular in an airplane engine,
a fluid supply element of an engine, in particular a space rocket engine,
a tube in which a fluid, in particular a heat-transfer fluid, flows, in particular in a reactor.

The heat source 30 may in particular generate, in proximity to the part to be protected, an environment at a temperature of greater than 400° C., greater than 500° C., greater than 600° C., greater than 700° C., and/or less than 1200° C., less than 1000° C., less than 900° C., less than 800° C.

According to the invention, the protective screen is inserted between the heat source 30 and the part 20.

The protective screen 10 is preferably deformed so as to form a protective screen adapted to the shape of the part 20 to be protected. It can in particular be deformed so as to extend, in the in-use position, to a substantially constant distance from the outer surface of the part 20.

The properties of the protective screen advantageously allow good deformability, for example so that the protective screen marries up with the part to be protected, without degradation of its properties.

The coating may be at least partially, or even totally, debound before or after being placed in the in-use position, preferably after being placed in the in-use position. Through this operation, the dry binder of the coating is at least partially, or even totally, eliminated, conventionally by calcining.

Debinding is a well-known operation for extracting organic components.

The calcining can be carried out for example by subjecting the coating to a temperature of greater than 120° C., preferably greater than 200° C., for a period of greater than 1 hour, preferably greater than 2 hours.

In one preferred embodiment, the debinding is subsequent to the placing of the protective screen in the in-use position. It conventionally results from the first use of the protective screen in its in-use position.

FIG. 2 shows an example of a coating after drying at 60° C. for 12 hours.

EXAMPLES

The following nonlimiting example is given for the purpose of illustrating the invention.

Production Protocol

The following raw materials are used:
as protective-particle powder, a Taimicron TM-DAR alumina powder sold by the company Krahn Chemie Gmbh,
as coupling agent, the A1100 silane sold by the company Momentive,
as support, a ⅕ satin fabric made of Quartzel® yarns having a grammage equal to 200 g/m², said yarns bearing the reference C14 80 Z0 QS1318 and being sold by the company Saint-Gobain Quartz.

In step 1), firstly, 3.3 g of A1100 silane and 411.7 g of demineralized water are mixed in a mixer. The total duration of the mixing is equal to 30 minutes.

The mixture of A1100 silane and of water, 85 g of TM-DAR alumina powder and 1000 g of a powder of alumina balls having a median size equal to 6 mm is then placed in a jar having a volume of 1 liter. The jar is closed, and is then rotated on a jar mill at a rotational speed equal to 50 rpm for 12 hours. The balls are then extracted.

The resulting suspension has the composition described in table 1 below.

TABLE 1

| Constituents | % by mass, on the basis of the mass of the suspension |
|---|---|
| TM-DAR alumina particle powder | 17 |
| A1100 silane | 0.7 |
| Demineralized water | 82.3 |

In step 2), the satin fabric is soaked in a bath of the suspension produced in step 1), for 30 seconds.

The satin fabric is then removed from the bath, and the surplus suspension is drained off vertically.

In step 3, the satin fabric obtained at the end of step 2) is dried in an oven at 60° C., with this temperature being maintained for a period of time equal to 12 hours.

After said drying, a protective screen is obtained.

The coating of the protective screen has the composition described in table 2 below.

TABLE 2

| Constituents | % by mass, on the basis of the mass of the coating |
|---|---|
| TM-DAR alumina particle powder | 96.0 |
| A1100 silane | 4.0 |

Characterization Protocol

Tensile Breaking Strength after Exposure to 600° C. for 100 Hours

The tensile breaking strength of the various protective screens, after exposure to a temperature equal to 600° C. for 100 hours, in an electric oven under air, is determined by means of the standard NF ISO 4606, on type II test specimens, at a room temperature equal to 22° C., modified with regard to the following points:
the elongation speed is constant and is equal to 20 mm/min,
the test specimen reference length is equal to 200 mm,
the frayed test specimen width is equal to 50 mm, the test specimens are stressed in the direction of the warp yarns, the breaking strength is measured in the direction of the warp yarns, 3 test specimens of each example are tested, and the value of the breaking strength is the arithmetic mean of the 3 measurements carried out.

Mass of the Coating

The support is weighed before application of the suspension (mass m1), then weighed after application of the suspension and drying at 60° C. for 12 hours (mass m2). The mass of the coating is the difference m2−m1. It is provided as mass percentage on the basis of the mass of the protective screen.

Chemical Analysis

The chemical analysis of the protective particles and of the yarns is measured by inductively coupled plasma (ICP) spectrometry for the elements of which the content does not exceed 0.5%. In order to determine the content of the other elements, a bead of the product to be analyzed is produced by melting the product, then the chemical analysis is carried out by X-ray fluorescence.

Results

The results obtained are summarized in table 3 below.

The protective screen of example 1, which is a comparative example, is identical to that of example 2 according to the invention, with the difference that the protective screen of the comparative example does not have the coating applied in steps 1) to 3).

TABLE 3

| Example | 1 | 2 |
|---|---|---|
| Mass of coating, as mass percentage on the basis of the mass of the protective screen | — | 9.5 |
| Coating distributed substantially uniformly? | — | Yes |
| Breaking strength (N/5 cm) | 235 | 409 |

The protective screen of example 2, according to the invention, has a tensile breaking strength, after exposure to 600° C. for 100 hours, equal to 409 N/5 cm, 74% higher than that of the protective screen of comparative example 1.

Other tests have shown that the protective screen according to the invention exhibits excellent deformability. In particular, there is limited breaking of the yarns. Without being limited by this theory, the coating might limit the mechanical action on the yarns when they are deformed when the protective screen is deformed so as to be placed in the in-use position.

As is presently clearly apparent, the invention provides a thermal protection which has a longer lifetime, by virtue of an improvement in the mechanical properties at high temperature, in particular in the temperature range 400° C.-900° C.

Of course, the invention is not limited to the example and to the embodiments described above. In particular, the protective screen could comprise other elements, for example a metal layer, in particular made of aluminum.

The invention claimed is:

1. A method for thermally protecting a part chosen from:
   a drive shaft,
   an engine attachment harness,
   an element for isolating an engine,
   a cylinder,
   a pipe,
   a cable,
   a conveyor roller, a system for attaching and driving said rollers,
   an insulation mat used in the thermal protection of a nacelle of an engine,
   an insulation mat used in the thermal protection of an engine,
   a suspension structure of an engine,
   a thrust reverser,
   a fluid supply element of an engine, and
   a tube in which a fluid flows,
   said method comprising:
   placing a protective screen in an in-use position, in which said protective screen physically isolates at least one portion of said part from a heat source, said heat source being configured to bring the temperature of said at least one portion of said part to a temperature of between 400° C. and 900° C. in the absence of said protective screen,
   the protective screen comprising a support of glass yarns, said yarns being at least partially coated with a coating consisting of a dry binder and of protective particles of a crystalline material having a melting point above 1000° C. and consisting of one or more oxides in an amount of more than 95% of its mass,
   said coating covering more than 50% of the outer surfaces of more than 50% by number of the yarns of said support,
   the coating having a mean thickness of greater than 0.05 µm and less than 2 µm;
   the mass of the coating, on the basis of the mass of the protective screen, being greater than 3% and less than 25%;
   corundum, zircon, zirconia, mullite, cordierite, eskolaite, spinel, steatite, enstatite, and mixtures thereof, representing more than 80% of the mass of the crystalline phases of the material of the protective particles.

2. The method as claimed in claim 1, wherein more than 50% of the thickness of the support comprises coated yarns.

3. The method as claimed in claim 2, wherein the entire thickness of the support comprises coated yarns.

4. The method as claimed in claim 3, wherein the coating:
   covers more than 80% of the outer surfaces of more than 80% by number of the yarns of the support.

5. The method as claimed in claim 1, comprising a production of the protective screen, said production comprising the following steps 1) to 3):
   1) preparing the support and a suspension comprising a liquid binder and the protective particles and/or precursors of protective particles;
   2) applying said suspension to the yarns of the support so as to cover more than 50% of the outer surfaces of more than 50% by number of the yarns of the support;
   3) drying so as to reduce the water content in order to convert the suspension into a coating which is in a solid form,
   so that the coating has a mean thickness of greater than 0.05 µm and less than 2 µm.

6. The method as claimed in claim 5, wherein the applying of the suspension to the yarns is carried out by impregnation of the support.

7. The method as claimed in claim 5, wherein, in step 1), a suspension not comprising protective particle precursors is prepared.

8. The method as claimed in claim 1, wherein the protective screen has a stiffness "c", measured according to standard ASTM D1388-18, option A, but at room temperature with a relative humidity equal to 50%, of greater than 5 mm and less than 150 mm.

9. The method as claimed in claim 8, wherein said stiffness is less than 110 mm.

10. The method as claimed in claim 8, in which said stiffness is greater than 20 mm so as to retain a shape given after deformation.

11. The method as claimed in claim 1, wherein the support is a textile.

12. The method as claimed claim 11, wherein the support essentially consists of glass yarns organized in the form of a knit, of a braid or of a fabric.

13. The method as claimed in claim 1, wherein more than 90% by number of the yarns of the support have a length of greater than 10 mm, said yarns being an assembly of fibers having an equivalent diameter, measured at half-length, of greater than 2 μm and less than 50 μm.

14. The method as claimed in claim 1, wherein the glass yarns constituting the support consist of an amorphous material having an $SiO_2$ content of greater than or equal to 55%, as mass percentage on the basis of the mass of the yarns.

15. The method as claimed in claim 14, wherein the glass yarns constituting the support consist of a material having, as mass percentages on the basis of the mass of the yarns:

an $SiO_2$ content of greater than 90% and an $Al_2O_3$ content of greater than 0.1% and less than 5%, the oxides other than $SiO_2$ and $Al_2O_3$ constituting the remainder to 100%, or an $SiO_2$ content of less than 79.9%, an $Al_2O_3$ content of greater than 12.5% and less than 32%, and an MgO content of greater than 4% and less than 20%, the oxides other than $SiO_2$, $Al_2O_3$ and MgO constituting the remainder to 100%, or an $SiO_2$ content of greater than 99.9%.

16. The method as claimed in claim 1, wherein the amount of protective particles, as mass percentage on the basis of the total mass of the coating, is greater than 29% and less than 99.5% and/or the protective particles have a median size of greater than 50 nm and less than 500 nm.

17. The method as claimed in claim 1, wherein more than 90%, as mass percentage, of the protective particles exhibit a chemical analysis such that the total content of $Al_2O_3+ZrO_2+MgO+Cr_2O_3+Fe_2O_3+SiO_2$ is greater than 80%, provided that $SiO_2<50\%$, as mass percentage on the basis of the oxides.

18. The method as claimed in claim 17, wherein the $Al_2O_3$ content is greater than 95%, as mass percentage on the basis of the oxides.

19. The method as claimed in claim 1, wherein, before the protective screen is placed in the in-use position, the coating of said screen is at least partially debound.

20. The method as claimed in claim 19, wherein the protective screen is made to fit the part to be protected before being sold.

21. The method as claimed in claim 1, comprising deforming the protective screen according to the shape of said part.

22. The method as claimed in claim 1, in which the drying is carried out at a temperature of less than 80° C.

23. The method as claimed in claim 1, in which each of said glass yarns has a uniform distribution of the protective particles in the coating.

24. A method for thermally protecting a part chosen from:
a drive shaft,
an engine attachment harness,
an element for isolating an engine,
a cylinder,
a pipe,
a cable,
a conveyor roller,
a system for attaching and driving said rollers,
an insulation mat used in the thermal protection of a nacelle of an engine,
an insulation mat used in the thermal protection of an engine,
a suspension structure of an engine,
a thrust reverser,
a fluid supply element of an engine, and
a tube in which a fluid flows,
said method comprising placing a protective screen in an in-use position, in which said protective screen physically isolates at least one portion of said part from a heat source, said heat source being configured to bring the temperature of said at least one portion of said part to a temperature of between 400° C. and 900° C. in the absence of said protective screen,
the protective screen comprising a support of glass yarns, said yarns being at least partially coated with a coating having a mean thickness of greater than 0.05 μm and less than 2 μm and consisting of a dry binder and of protective particles of a crystalline material having a melting point above 1000° C. and consisting of one or more oxides in an amount of more than 95% of its mass,
said coating covering more than 50% of the outer surfaces of more than 50% by number of the yarns of said support,
corundum, zircon, zirconia, mullite, cordierite, eskolaite, spinel, steatite, enstatite, and mixtures thereof, representing more than 80% of the mass of the crystalline phases of the material of the protective particles.

25. The method as claimed in claim 24, in which each of said glass yarns has a uniform distribution of the protective particles in the coating.

26. A method for thermally protecting a part chosen from:
a drive shaft,
an engine attachment harness,
an element for isolating an engine,
a cylinder,
a pipe,
a cable,
a conveyor roller,
a system for attaching and driving said rollers,
an insulation mat used in the thermal protection of a nacelle of an engine,
an insulation mat used in the thermal protection of an engine,
a suspension structure of an engine,
a thrust reverser,
a fluid supply element of an engine, and
a tube in which a fluid flows,
said method comprising:
placing a protective screen in an in-use position, in which said protective screen physically isolates at least one portion of said part from a heat source, said heat source being configured to bring the temperature of said at least one portion of said part to a temperature of between 400° C. and 900° C. in the absence of said protective screen,
the protective screen comprising a support of glass yarns at least partially coated with a coating consisting of a dry binder and of protective particles of a crystalline material having a melting point above 1000° C. and consisting of one or more oxides in an amount of more than 95% of its mass, said coating covering more than 50% of the outer surfaces of more than 50% by number
of the yarns of said support,
the coating having a mean thickness of greater than 0.05
μm and less than 2 μm;
the mass of the coating, on the basis of the mass of the protective screen, being greater than 3% and less than
25%;
corundum, zircon, zirconia, mullite, cordierite, eskolaite,
spinel, steatite, enstatite, and mixtures thereof, repre-
senting more than 80% of the mass of the crystalline
phases of the material of the protective particles;
said method comprising a production of the protective
screen, said production comprising the following steps
1) to 3):
1) preparing the support and a suspension comprising a
liquid binder and the protective particles and/or pre-
cursors of protective particles;
2) applying said suspension to the yarns of the support so
as to cover more than 50% of the outer surfaces of more
than 50% by number of the yarns of the support;
3) drying so as to reduce the water content in order to
convert the suspension into a coating which is in a solid
form,
the suspension comprising a film-forming agent.
27. The method as claimed in claim 26, in which each of
said glass yarns has a uniform distribution of the protective
particles in the coating.

\* \* \* \* \*